(12) United States Patent
Geoffroy et al.

(10) Patent No.: US 11,959,493 B2
(45) Date of Patent: Apr. 16, 2024

(54) TURBOMACHINE WITH E-MACHINE HOUSING THERMAL FLUID RETAINER MEMBER

(71) Applicant: Garrett Transportation I Inc, Torrance, CA (US)

(72) Inventors: Jean-Michel Geoffroy, Villers-lès-Nancy (FR); Philippe Renaud, Sanchey (FR); Baptiste Van Haesebroeck, Xonrupt-Longemer (FR)

(73) Assignee: GARRETT TRANSPORTATION I INC, Torrance, CA (US)

( * ) Notice: Subject to any disclaimer, the term of this patent is extended or adjusted under 35 U.S.C. 154(b) by 29 days.

(21) Appl. No.: 17/447,866

(22) Filed: Sep. 16, 2021

(65) Prior Publication Data

US 2023/0082201 A1 Mar. 16, 2023

(51) Int. Cl.
*F04D 29/58* (2006.01)
*F04D 25/04* (2006.01)
*F04D 25/06* (2006.01)
*H02K 9/22* (2006.01)

(52) U.S. Cl.
CPC .......... *F04D 29/5806* (2013.01); *F04D 25/04* (2013.01); *F04D 25/06* (2013.01); *H02K 9/223* (2021.01); *F05D 2220/40* (2013.01); *F05D 2220/76* (2013.01); *F05D 2260/221* (2013.01)

(58) Field of Classification Search
CPC .......... H02K 9/22; H02K 9/223; H02K 9/227; H02K 15/12; F04D 29/582; F04D 29/5806; F04D 29/5853
USPC ...................................... 310/43, 44, 64, 260
See application file for complete search history.

(56) References Cited

U.S. PATENT DOCUMENTS

| 6,201,321 B1 * | 3/2001 | Mosciatti | H02K 9/223 310/43 |
| 10,069,388 B2 * | 9/2018 | Court | H02K 15/03 |
| 2017/0167286 A1 * | 6/2017 | Ogata | F01D 25/24 |

FOREIGN PATENT DOCUMENTS

| EP | 2053213 A1 | 4/2009 |
| EP | 3064718 A1 | 9/2016 |
| EP | 3142177 A1 | 3/2017 |
| EP | 3623597 A1 | 3/2020 |
| WO | 2010081123 A1 | 7/2010 |

OTHER PUBLICATIONS

Bott et al. 'Stator of an Electric Machine': 17447866_2023-03-16_EP_3389168_A1_M.pdf (with Mach. Trans), (Oct. 2017) (Year: 2017).*

* cited by examiner

*Primary Examiner* — Kenneth J Hansen
(74) *Attorney, Agent, or Firm* — LORENZ & KOPF, LLP (57) ABSTRACT

A turbomachine includes a housing with an e-machine housing. Also, the turbomachine includes a rotating group supported for rotation within the housing. Moreover, the turbomachine includes an e-machine that is configured as at least one of an electric motor and an electric generator, that is operatively coupled to the rotating group, and that includes a stator that is housed within the e-machine housing. Furthermore, the turbomachine includes a thermal bridge member that extends between the stator and the e-machine housing to define a thermal path for heat to transfer from the stator to the e-machine housing. The e-machine housing includes a thermal bridge retainer member that defines an outer boundary of the thermal bridge member.

10 Claims, 6 Drawing Sheets

TURBOMACHINE WITH E-MACHINE HOUSING THERMAL FLUID RETAINER MEMBER

TECHNICAL FIELD

The present disclosure generally relates to a turbomachine and, more particularly, relates to a turbomachine with an e-machine housing having a thermal fluid retainer member.

BACKGROUND

Some turbomachines are provided with an e-machine. For example, some turbochargers, superchargers, and other compressor devices may include a compressor section that compresses a fluid via rotation of a rotating group within a housing, and these devices may also include an electric motor that drives (or assists in driving) rotation of the rotating group. Additionally, some devices may include an electric generator that converts rotational energy of the rotating group into electrical energy.

However, challenges remain. Excessive temperatures can negatively affect operation and/or efficiency of these devices. The e-machine may cause and/or contribute to increased temperatures during operation of these e-machine equipped turbomachines. Conventional cooling systems/features may be insufficient for some e-machines. Also, these cooling systems/features may decrease manufacturability and/or increase costs.

Thus, it is desirable to provide a turbomachine with an operably attached e-machine having improved cooling features. It is also desirable to provide a turbomachine that is also highly manufacturable and cost effective. Other desirable features and characteristics of the present disclosure will become apparent from the subsequent detailed description and the appended claims, taken in conjunction with the accompanying drawings and this background discussion.

BRIEF SUMMARY

In one embodiment, a turbomachine is disclosed that includes a housing with an e-machine housing. Also, the turbomachine includes a rotating group supported for rotation within the housing. Moreover, the turbomachine includes an e-machine that is configured as at least one of an electric motor and an electric generator, that is operatively coupled to the rotating group, and that includes a stator that is housed within the e-machine housing. Furthermore, the turbomachine includes a thermal bridge member that extends between the stator and the e-machine housing to define a thermal path for heat to transfer from the stator to the e-machine housing. The e-machine housing includes a thermal bridge retainer member that defines an outer boundary of the thermal bridge member.

In another embodiment, a method of manufacturing a turbomachine is disclosed that includes providing a housing that includes an e-machine housing and a retainer member. Also, the method includes supporting a rotating group for rotation within the housing. Furthermore, the method includes operatively coupling an e-machine to the rotating group. The e-machine is configured as at least one of an electric motor and an electric generator. Additionally, the method includes extending a thermal bridge member between a stator of the e-machine and the e-machine housing to define a thermal path for heat to transfer from the stator to the e-machine housing. Moreover, the method includes defining an outer boundary of the thermal bridge member with the retainer member.

In an additional embodiment, an e-charging device is disclosed that includes a housing with a motor housing. The motor housing has an inner axial surface. The e-charging device further includes a rotating group supported for rotation within the housing. Moreover, the e-charging device includes a fluid compressor section that is cooperatively defined by the housing and the rotating group. Furthermore, the e-charging device includes an electric motor that is coupled to the rotating group for drivingly rotating the rotating group about an axis within the housing. The electric motor includes a stator that is housed within the motor housing. Also, the e-charging device includes a thermal bridge member that extends between the stator and the motor housing to define a thermal path for heat to transfer from the stator to the motor housing. Additionally, the motor housing including a thermal bridge retainer member that is cooperatively defined by the inner axial surface and a dam wall of an insert that overlies the inner axial surface. The dam wall defines an outer boundary of the thermal bridge member to retain the thermal bridge member in a position proximate the stator of the electric motor.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a turbomachine with an operably attached e-machine, such as an electric motor, that includes heat transfer features for maintaining operating temperatures within acceptable ranges. The turbomachine may include a so-called "thermal bridge member," such as thermal compound, thermal fluid, thermal paste, or other thermal interface for defining a thermal path for heat to transfer away from the turbomachine. Accordingly, the e-machine may provide highly efficient performance without dramatically increasing operating temperatures.

In some embodiments, the turbomachine may include a thermal bridge retainer member. More specifically, the e-machine may be housed within an e-machine housing, and thermal fluid (e.g., a thermal paste) with a relatively high thermal conductivity may be included to provide a thermal conductive path for heat transfer out of the stator of the e-machine, into the housing, and away from the e-machine. This configuration may be provided in an air-cooled e-machine in some embodiments.

The thermal fluid retainer member may be included for retaining the thermal fluid in a predetermined position relative to the stator of the e-machine. The retainer member may be disposed adjacent and proximate one or more axial end turns of the stator. The retainer member may define a receptacle that receives and retains the thermal fluid. The thermal fluid may be applied and received within the receptacle, and the retainer member may keep the thermal fluid within the receptacle (and, thereby, proximate the end turns of the stator) while the thermal fluid cures. The retainer member may also retain the thermal fluid in position during assembly of the e-machine and its housing.

In some embodiments, the retainer member may include a plurality of receptacles for retaining individual amounts of the thermal fluid. Accordingly, the retainer member may include individual receptacles for individual amounts of the thermal fluid, and the retainer member may retain the fluid in position proximate the end-turn areas of the stator member of the e-machine.

Moreover, in some embodiments, the retainer member may be cooperatively defined by a surface of an e-machine housing member (e.g., an end-cap) and an insert that is removably attached to the housing member. The insert may include a plurality of dam walls (e.g., continuous bands) that are attached by a connecting member in some embodiments to increase manufacturing efficiency.

Accordingly, the retainer member may be used for efficient application of the thermal fluid over the end-turn areas of the stator. Thus, heat may be effectively transferred out and away from the stator during operation of the e-machine. The efficiency of the e-machine may be increased as a result. Furthermore, the retainer member may be included in a highly manufacturable manner.

Figure 1:
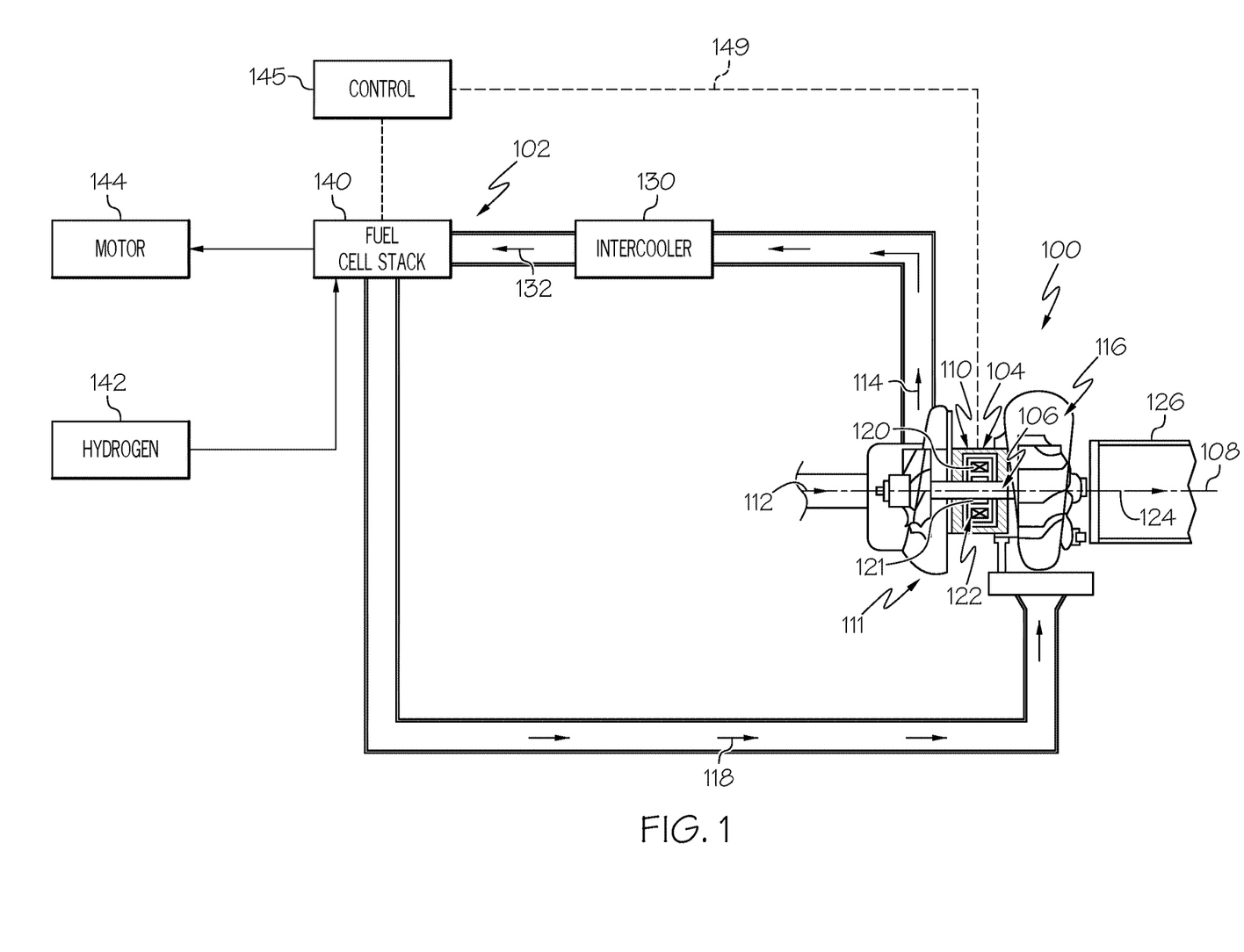
FIG. 1 is a schematic illustration of a turbomachine incorporated, for example, in a fuel cell system.

FIG. 1 is a schematic view of an example turbomachine 100 according to example embodiments of the present disclosure. In some embodiments, the turbomachine 100 may be incorporated within a fuel cell system 102 of a vehicle.

Generally, the turbomachine 100 may be configured as an e-boost device, such as an e-machine-equipped turbocharger. However, it will be appreciated that the turbomachine 100 may be configured differently without departing from the scope of the present disclosure. As shown in the illustrated embodiments, the turbomachine 100 may generally include a compressor section 111, a turbine section 116, and an e-machine section 110. Furthermore, the turbomachine 100 may generally include a housing 104 and a rotating group 106 that is supported within the housing 104 for rotation about an axis 108. The housing 104 and the rotating group 107 may cooperatively define the compressor section 111, the turbine section 116, and the e-machine section 110. Also, in some embodiments, the compressor section 111 and the turbine section 116 may be spaced apart along the axis 108 with the e-machine section 110 disposed axially therebetween.

In some embodiments, the e-machine section 110 may be configured as a motor section for the turbomachine 100. Thus, the e-machine section 110 may include an electric motor 122 that is configured to drive the rotating group 106 in rotation about the axis 108. However, the e-machine section 110 may be configured as a generator for generating electric energy from the mechanical (rotational) energy of the rotating group 107. In additional embodiments, the e-machine section 110 may operate in some modes as a motor and may operate in other modes as a generator.

As schematically shown in FIG. 1, the motor 122 may include a stator 120 and a rotor member 121. The rotor member 121 may be fixed to the shaft of the rotating group 106. The stator 120 may be supported within the housing 104.

The compressor section 111 may include a compressor wheel that is fixed to the shaft of the rotating group 106 and that rotates within a compressor housing member of the housing 104. The compressor housing may include a volute passage extending about the axis 108. As a result of rotation, the compressor section 111 may compress an axially-received input air stream 112 and direct it radially as a pressurized air stream 114. This pressurized air stream 114 may be directed to the fuel cell system 102.

The turbine section 116 may include a turbine wheel that is fixed to the opposite end of the shaft of the rotating group 106. The turbine wheel may rotate within a turbine housing member of the housing 104. The turbine section 116 may be configured to receive a high-pressure and high-temperature exhaust gas stream 118 from the fuel cell system 102. The turbine section 116 may transfer and/or convert energy of the exhaust gas stream 118. For example, the turbine section 116 may drive the rotating group 106 to drive rotation of the compressor wheel in the compressor section 111. The high-pressure exhaust gas stream 118 may become a lower-pressure exhaust gas stream 124 that is released into a downstream exhaust pipe 126.

From the compressor section 111, the pressurized air stream 114 may be characterized by an increased temperature, over that of the input air stream 112. Accordingly, the air stream 114 may be channeled through an air cooler 130 (i.e., an intercooler), such as a convectively-cooled air cooler. The air cooler 130 may be configured to dissipate heat from the air stream 114, increasing its density. The resulting cooled and pressurized air stream 132 may be channeled to a fuel cell stack 140, or alternatively, into a subsequent-stage, in-series compressor.

Hydrogen may be supplied to the fuel cell stack 140 from a tank 142, and oxygen may be supplied to the fuel cell stack 140 to generate electricity by a known chemical reaction. The fuel cell stack 140 may generate electricity for an electrical device, such as an electric motor 144.

A control system 145 may be included for controlling the various systems. The control system 145 may be connected to one or more components via communication connection(s) 149. The control system 145 may be a computerized system with a processor, various sensors, and other components for electrically controlling operation of the motor 144, the fuel cell stack 140, and/or the turbomachine 100. Also, the fuel cell system 102 may be included in a vehicle, such as a car, truck, sport utility vehicle, van, motorcycle, etc. Therefore, in some embodiments, the electric motor 144 may convert the electrical power to mechanical power to drive and rotate an axle (and, thus, one or more wheels) of the vehicle. In these embodiments, the control system 145 may be incorporated within a vehicle control unit, which controls a number of additional vehicle systems (e.g., braking systems, air-conditioning systems, etc.).

Thus, during operations, oxygen may be provided to the fuel cell stack 140, at least in part, by the turbomachine 100 as represented in FIG. 1. More specifically, the motor 122 may drive rotation of the rotating group 106, and the compressor section 111 may provide the pressurized air stream 114 to the air cooler 130 as it flows to the stack 140, and the exhaust gas stream 118 from the stack 140 may be fed back to the turbine section 116 for providing power assist to the motor 122. It will be appreciated, however, that other embodiments of the turbomachine 100 fall within the scope of the present disclosure. For example, in some embodiments, the turbine section 116 may be omitted such that the turbomachine 100 includes the e-machine section 110 as well as the compressor section 111. Additionally, in some embodiments, the turbomachine 100 may include a plurality of sections, such as a plurality of compressor sections that are fluidly connected in succession to include a first (low pressure) stage that feeds a second (high pressure) stage that ultimately feeds the fuel cell system 102. Moreover, the turbomachine 100 may be provided in systems other than the fuel cell system 102 without departing from the scope of the present disclosure. Furthermore, the turbomachine 100 may be configured as an e-boosting device, an electrically-driven compressor assembly, an electric supercharger, as a hybrid turbocharger, as an e-charger device, e-turbo, or other related component.

Figure 2:
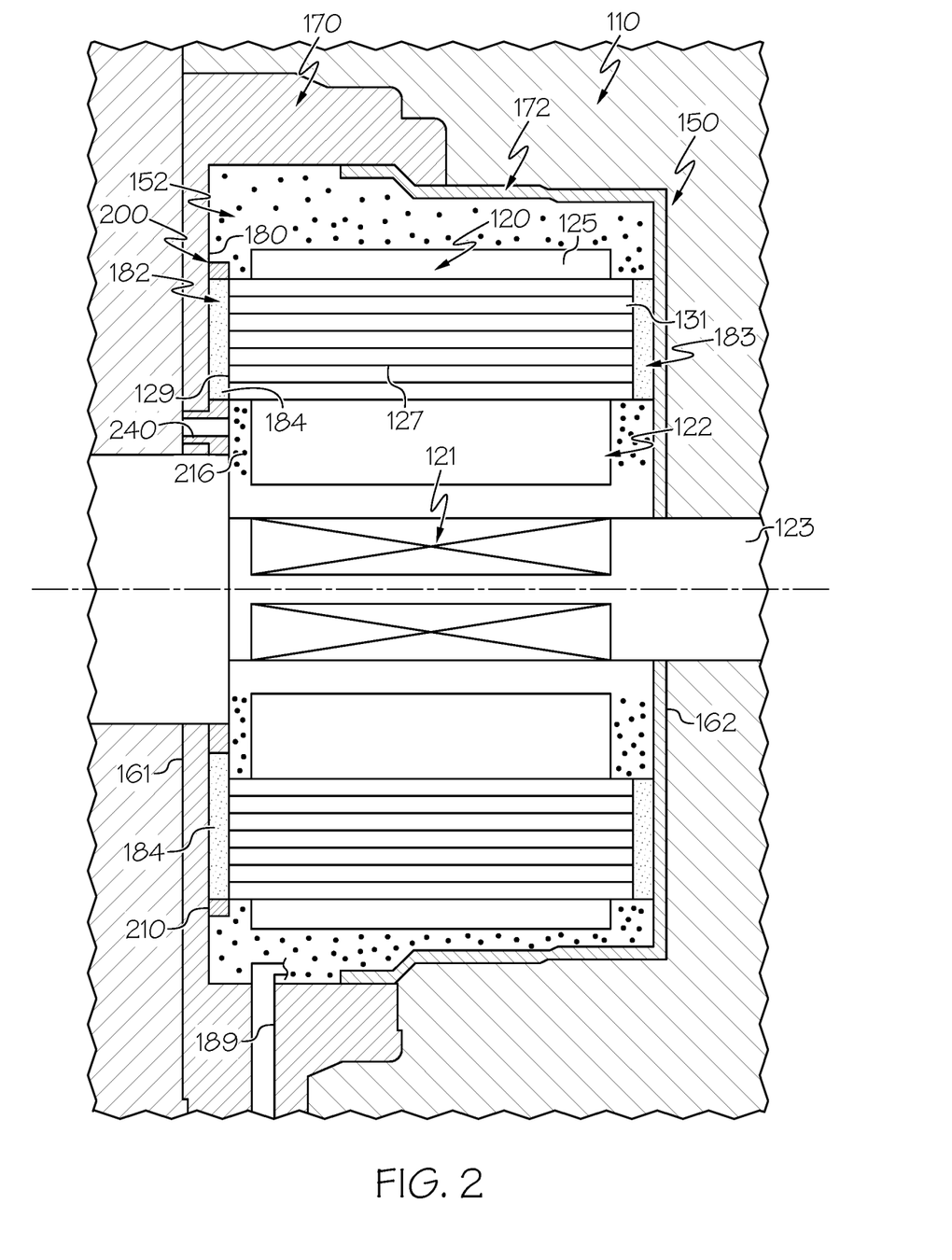
FIG. 2 is a cross-sectional view of a motor section of the turbomachine according to example embodiments of the present disclosure.

Referring now to FIG. 2, the e-machine section 110 is shown in greater detail according to example embodiments. As shown, the section 110 extends axially between a first end 161 and a second end 162. Also, the motor 122 may include a number of teeth 125 as well as windings 127 that extend axially and wrap about the respective ones of the teeth 125. The windings 127 may include first turns 129 proximate the first axial end 161 of the respective tooth 125 and second turns 131 proximate the second axial end 162.

Furthermore, the motor 122 may be housed and largely encapsulated within a motor case 150 of the housing 104. Generally, the motor case 150 may be a hollow, shell-like, thin-walled body. At least part of the motor case 150 may exhibit high thermal conductivity for transferring heat out from the motor 122 and to the areas surrounding the motor case 150. The motor case 150 may include an interior motor cavity 152 therein. The size and dimensions of the motor cavity 152 may substantially correspond to that of the stator 120 of the motor 122 to be nested and supported therein. The rotor member 121 of the motor 122 may be supported on the shaft 123 of the rotating group 106 to rotate therewith. The shaft 123 may extend and project out from both axial sides of the motor case 150. Otherwise, the motor case 150 may substantially house, encapsulate, and support the motor 122.

In some embodiments, the motor case 150 may be cylindrical and/or barrel-shaped. Also, a majority of the motor case 150 may be cooperatively defined by a cap 170 and a sleeve 172.

Figure 3:
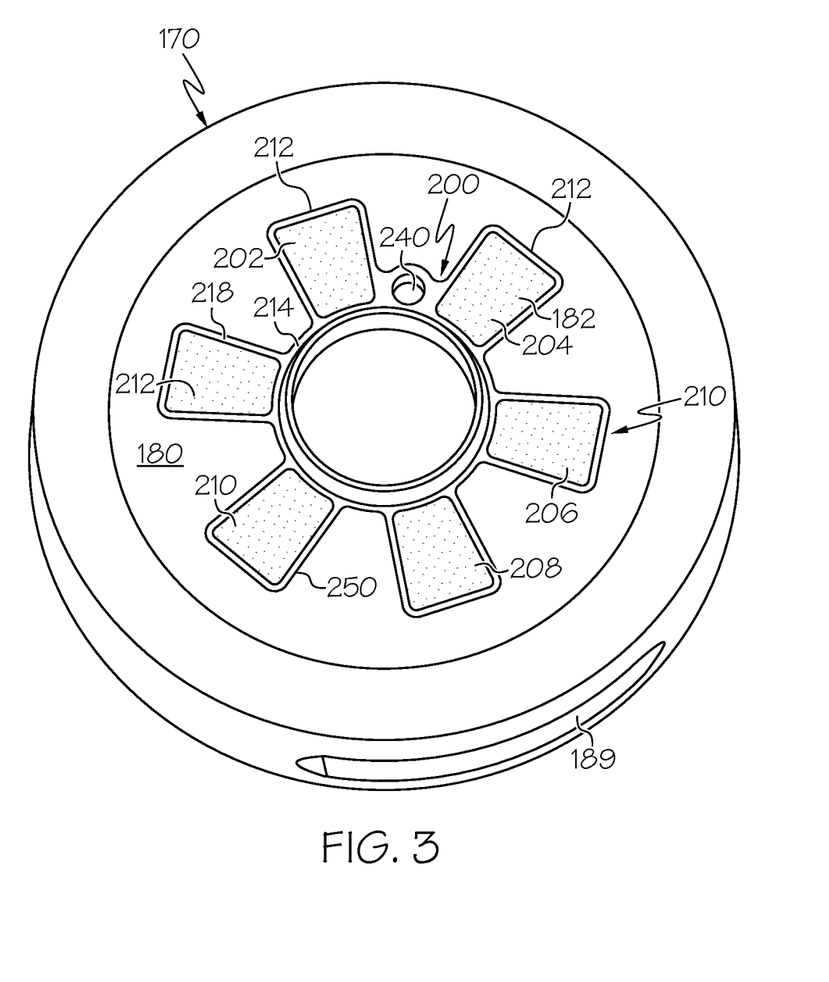
FIG. 3 is an isometric view of a motor housing and an insert that cooperatively define a thermal fluid retainer member according to example embodiments of the present disclosure.

As shown in FIGS. 2 and 3, the cap 170 may be cylindrical and disc-shaped and may define the first axial end 161 of the case 150. The sleeve 172 may be hollow and cup-shaped and may define the second axial end 162 of the case 150. The stator 120 may be received within the sleeve 172, and the cap 170 may be fixedly attached to the open end of the sleeve 172 to cover over the stator 120.

As shown in FIG. 2, the cap 170 may include an inner, axial surface 180, which defines an axial boundary of the motor cavity 152. The axial surface 180 faces, spans across, and covers the turns 129 of the stator 120. The axial surface 180 is shown as flat and planar and substantially normal to the axis 108 in FIG. 2; however, it will be appreciated that the surface 180 may be non-planar and may include a number of surface features, for example, features that contour according to internal components within the motor cavity 152.

The cap 170 may further include a radial aperture 189 (FIGS. 2 and 3). The radial aperture 189 may be an elongate slot that extends radially through the rim of the cap 170. As shown in FIG. 2, the radial aperture 189 may allow passage of one or more connector cables 197, etc. for powering and controlling the motor 122.

The e-machine section 110 may further include at least one thermal bridge member 182. The thermal bridge member 182 may include and/or may be formed of a thermal paste (i.e., a cured thermal paste). As such, the thermal bridge member 182 may exhibit high thermal conductivity. The thermal bridge member 182 may include one or more pads 184 of this thermally conductive material. The pad 184 may be a thin pad that extends in a thickness direction (axially) between the first turns 129 of the stator 120 and the axial surface 180 of the cap 170. The first turns 129 may be at least partly embedded within the material of the thermal bridge member 182. Furthermore, there may be a plurality of pads 184 that are spaced evenly about the axis 108. There may be six (6) pads 184 in some embodiments, and the pads 184 may be disposed proximate respective ones of the first turns 129 of the stator 120.

Also, as shown in FIG. 2, the e-machine section 110 may include one or more additional thermal bridge members 183 (i.e., second thermal bridge members 183). The second thermal bridge members 183 may be substantially similar to the first thermal bridge members 182, except the second thermal bridge members 183 may be disposed proximate the second end 162 and may be disposed on the sleeve 172.

Moreover, the e-machine section 100 may include a thermal bridge retainer member 200 as shown in FIGS. 2 and 3. Generally, the retainer member 200 may retain the thermal bridge member 182 and define an outer boundary thereof. Accordingly, in some embodiments, the retainer member 200 may maintain the thermal bridge member 182 in position over the turns 129 of the stator 120.

Figure 4:
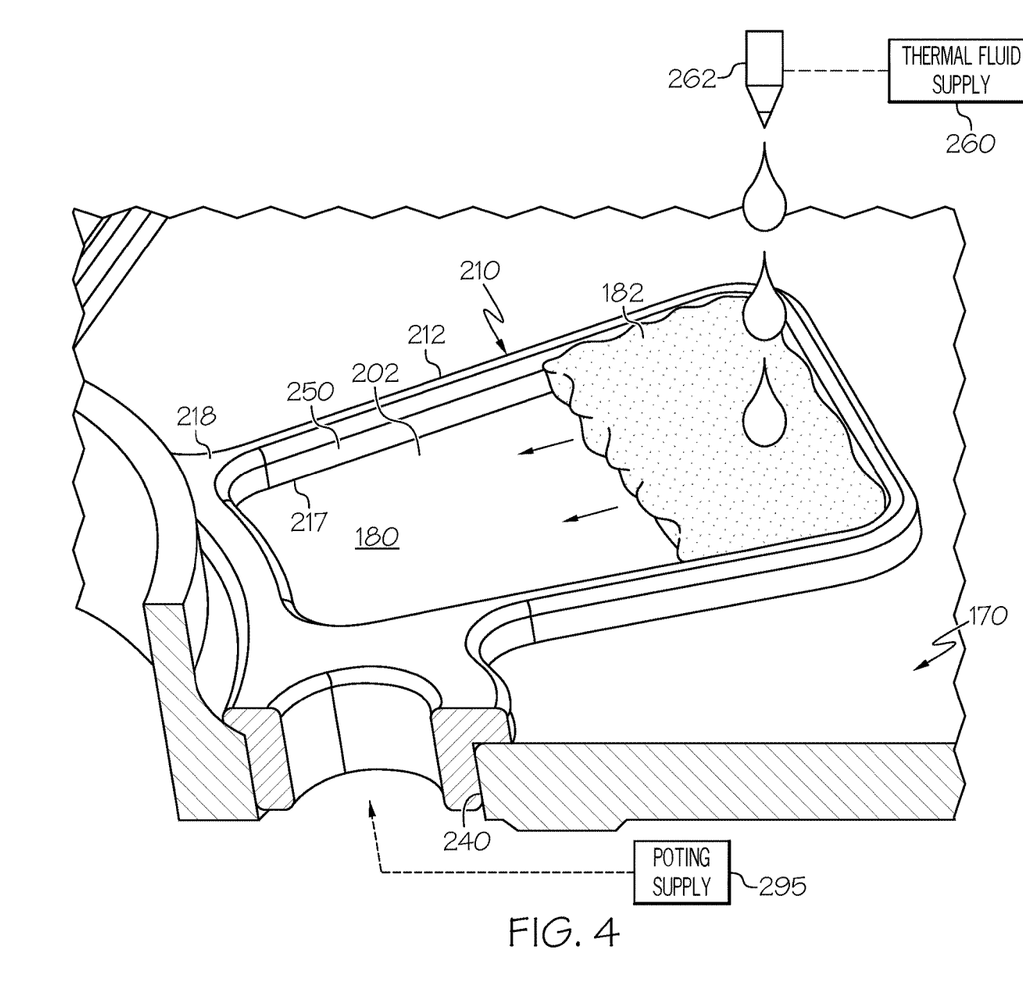
FIG. 4 is a detail view of the retainer member of FIG. 3 and a thermal fluid shown schematically during application.
Figure 5:
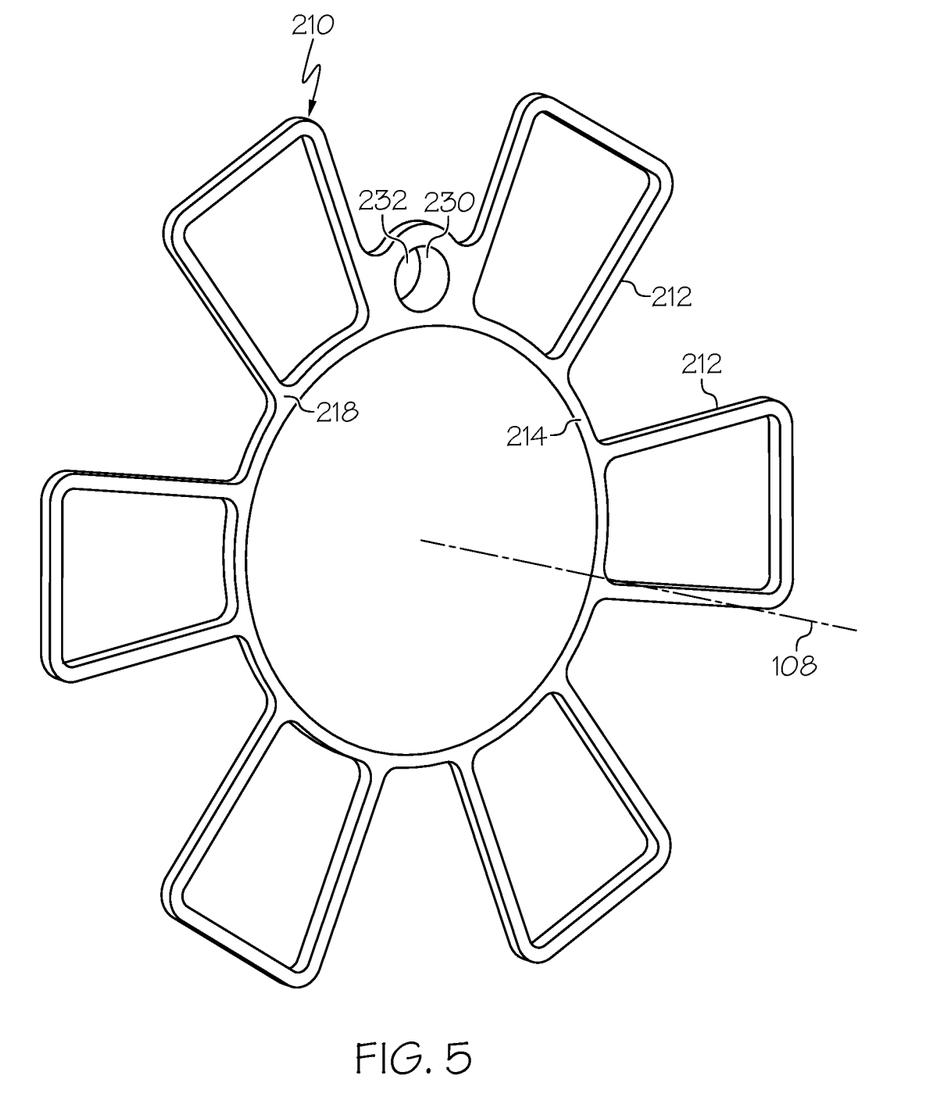
FIG. 5 is a first side isometric view of the insert of the retainer member of FIG. 3.
Figure 6:
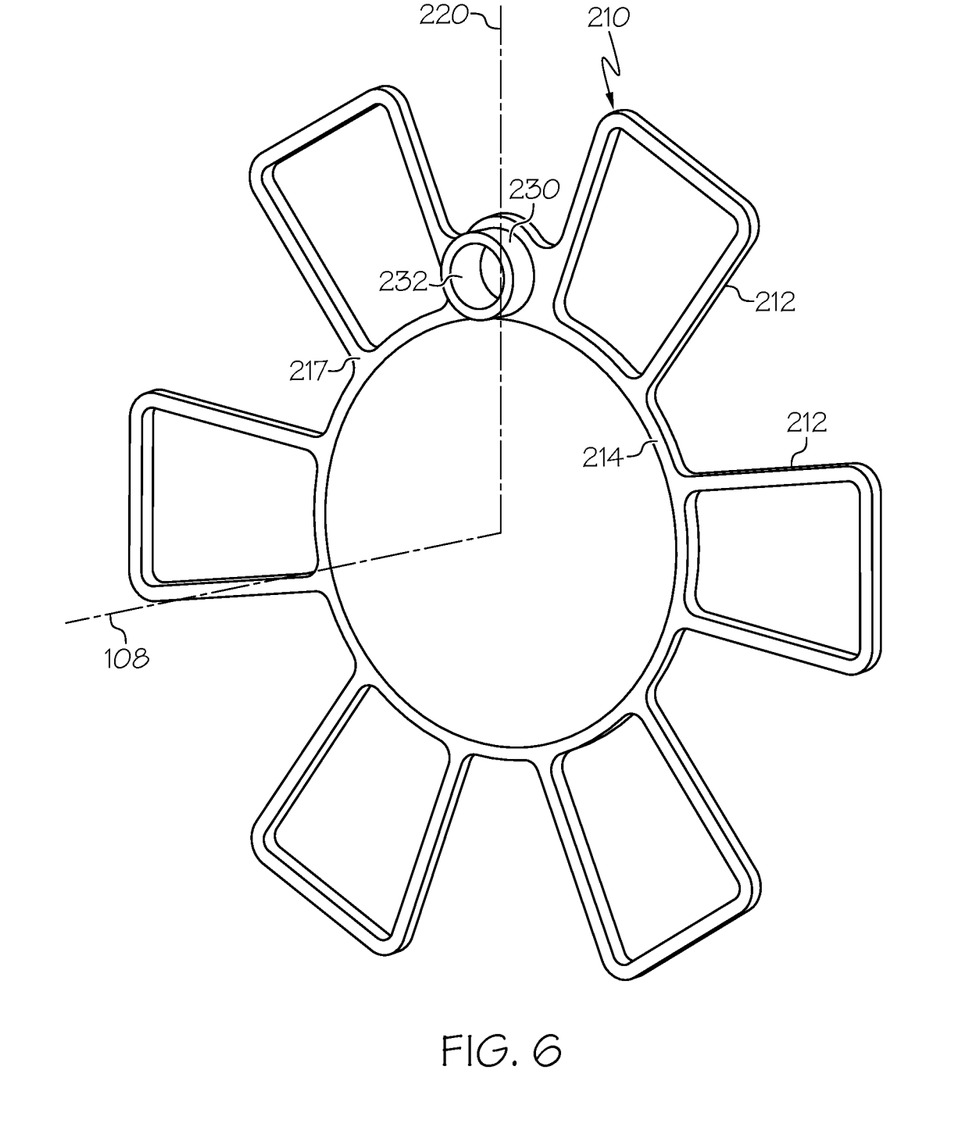
FIG. 6 is a second side isometric view of the insert of the retainer member of FIG. 3.

In some embodiments, the thermal bridge retainer member 200 may be at least partly defined by an insert 210 (FIGS. 2-6). The insert 210 may be a unitary, one-piece part made out of a polymeric material. The insert 210 may include a plurality of bands 212 that are connected by an inner connecting member 214. The bands 212 may be polygonal (e.g., with four sides) and may be shaped according to that of the turns 129 of the stator 120. The connecting member 214 may be an annular band that is centered about the axis 108 and may connect the inner radial portions of the bands 212. Thus, in some embodiments, the bands 212 may be spaced circumferentially about the axis 108 evenly and may radiate from the connecting member 214. This pattern may correspond to the arrangement, dimensions, and positions of the first turns 129 of the stator 120. Furthermore, the insert 210 may be substantially symmetric, at least, about a radial line of symmetry 220 (FIG. 6).

The insert 210 may also include a first axial side 217 and a second axial side 218. Also, in some embodiments, the insert 210 may include a projection 230 with an aperture 232 extending axially therethrough. The projection 230 may be cylindrical and hollow and may be disposed circumferentially between two of the bands 212 and proximate the connecting member 214. The projection 230 may project axially from the first axial side 217.

As shown in FIGS. 2, 3, and 4, the first axial side 217 may be layered over the axial surface 180 of the cap 170. The connecting member 214 may encircle the shaft 123 and may be centered on the axis 108. The second axial side 218 of the insert 210 may extend toward the stator 120. The projection 230 may be received within a through-hole 240 (FIGS. 2-4) of the cap 170.

Accordingly, the bands 212 may define dam walls 250 that continuously extend along the axial surface 180 of the end-cap 170 and that project axially therefrom. Thus, the retainer member 200 may include a plurality of distinct receptacles 202, 204, 206, 208, 210, 212. The receptacles 202-212 may respectively receive an amount of the material of the thermal bridge member 182 as shown in FIGS. 3 and 4 and retain this material for placement relative to the turns 129 of the stator 120.

More specifically, during manufacture (before the cap 170 and sleeve 172 are attached), the insert 210 may be layered on the axial surface 180 of the cap 170. Then, as shown in FIG. 4, thermal fluid (e.g., a known thermal paste material) may be provided from a supply 260 and applied by an applicator 262 (e.g., an automated applicator) to the receptacles 202, 204, 206, 208, 210, 212. In some embodiments, the material may be applied on top of the surface 180 and within the dam walls 250 with the direction of gravity being normal to and directed toward the surface 180.

Meanwhile, the stator 120 and the rest of the motor 122 may be provided within the sleeve 172. In some embodiments, this may include providing the additional thermal bridge member 183 between the turns 131 and the sleeve 172 at the second end 162. Once the additional thermal bridge member 183 has cured, the sleeve 172 and the stator 120, etc. included therein may be lowered onto the cap 170 such that the first turns 129 embed within the uncured thermal fluid contained within the receptacles 202, 204, 206, 208, 210, 212. It will be appreciated that the dam walls 250 may retain the uncured thermal fluid within the respective receptacles 202, 204, 206, 208, 210, 212. Then, the thermal fluid may be cured against the 129 of the stator 120 and against the surface 180 to define the axial boundaries of the thermal bridge member 182. The thermal fluid may also be cured against the dam walls 250 to define the radial boundaries of the thermal bridge member 182. Once the thermal fluid is cured, a potting material 216 (FIG. 2) may be supplied into the motor cavity 152 via the through-hole 240 and the aperture 232 from a potting material supply 295 (FIG. 4).

Thus, the thermal bridge retainer member 200 may ensure that the thermal bridge member 182 is in position for effective motor cooling. The bridge retainer member 200 may increase manufacturing efficiency and may allow for automated, high-volume manufacturing.

It will be appreciated that the thermal bridge retainer member 200 may be configured differently without departing from the scope of the present disclosure. For example, in additional embodiments, the insert 210 may be configured differently so that it independently defines the receptacles 202, 204, 206, 208, 210, 212. Furthermore, the insert 210 may be positioned differently within the motor case 150 to provide the thermal bridge member 182 at a different location relative to the motor 122.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A method of manufacturing a turbomachine comprising:
providing a housing that includes an e-machine housing and a retainer member;
inserting an insert of the e-machine housing into the e-machine housing and removably attaching the insert to the e-machine housing; and
supporting a rotating group for rotation within the housing;
operatively coupling an e-machine to the rotating group, the e-machine configured as at least one of an electric motor and an electric generator, the e-machine including a stator with an axial end and windings included at the axial end;
housing the stator within the e-machine housing, including the e-machine housing including a surface that spans across at least part of the windings at the axial end of the stator;
extending a thermal bridge member between at least part of the windings at the axial end of the stator of the e-machine and the surface of the e-machine housing to define a thermal path for heat to transfer from the stator to the e-machine housing;
defining an outer boundary of the thermal bridge member with the retainer member;
the insert including a dam wall, the dam wall cooperating with the surface to define the retainer member;
the insert including a projection that is received within the surface; and
the projection including an aperture that extends through the projection.

2. The method of claim 1, wherein the dam wall is continuous.

3. The method of claim 1, wherein the surface is an axial surface of the e-machine housing; and
further comprising assembling the e-machine housing with the axial end facing the axial surface and with the thermal bridge member extending between the axial end of the stator and the axial surface.

4. The method of claim 3, wherein the insert includes a plurality of connected dam walls that define respective ones of a plurality of receptacles;
wherein the thermal bridge member is included in the plurality of receptacles arranged about an axis of rotation of the rotating group.

5. The method of claim 1, further comprising applying a thermal fluid into a receptacle of the retainer member; and
curing the thermal fluid within the receptacle to define the outer boundary of the thermal bridge member.

6. A turbomachine comprising:
a housing that includes an e-machine housing;
a rotating group supported for rotation within the housing;
an e-machine that is configured as at least one of an electric motor and an electric generator, that is operatively coupled to the rotating group, and that includes a stator that is housed within the e-machine housing;
a thermal bridge member that extends between the stator and the e-machine housing to define a thermal path for heat to transfer from the stator to the e-machine housing; and the e-machine housing including a thermal bridge retainer member that defines an outer boundary of the thermal bridge member;

the e-machine housing including a surface that spans across and covers over at least part of the stator;

the e-machine housing including an insert that is removably attached to the e-machine housing;

the insert including a dam wall, the dam wall and the surface cooperating with the surface to define the retainer member;

the insert including a projection that is received within the surface; and the projection including an aperture that extends through the projection.

7. The turbomachine of claim 6, wherein the dam wall is continuous.

8. The turbomachine of claim 7, wherein the dam wall is one of a plurality of continuous dam walls of the insert, the plurality of continuous dam walls being connected via a connecting member.

9. The turbomachine of claim 6, further comprising a potting material, and wherein the aperture is a potting injection hole for injecting the potting material from outside the e-machine housing.

10. The turbomachine of claim 6, wherein the stator includes an axial end, wherein the surface is an axial surface facing the axial end of the stator, and wherein the insert is layered on the axial surface such that the dam wall and the axial surface define a receptacle that receives the thermal bridge member.

* * * * *